United States Patent
Paavila

[11] Patent Number: 5,766,658
[45] Date of Patent: Jun. 16, 1998

[54] ICE CREAM CONFECTION

[76] Inventor: Jack Paavila, Box 1151, Alexandria, Ontario, Canada, K0C 1A0

[21] Appl. No.: 747,435

[22] Filed: Nov. 12, 1996

[51] Int. Cl.[6] ................................................. A23G 9/00
[52] U.S. Cl. .......................... 426/95; 426/102; 426/101; 426/139
[58] Field of Search ........................ 426/95, 100, 101, 426/102, 139, 306

[56] References Cited

U.S. PATENT DOCUMENTS

| | | | |
|---|---|---|---|
| 1,893,842 | 1/1933 | Nehf | 426/95 |
| 1,893,941 | 1/1933 | Hopkins | 426/139 |
| 1,917,137 | 7/1933 | Marchio | 426/101 |
| 1,942,896 | 1/1934 | Jones | 426/139 |
| 2,046,729 | 7/1936 | Denaro | 426/139 |
| 2,061,260 | 11/1936 | Turnbull | 426/139 |
| 2,167,353 | 7/1939 | Frediani | 426/95 |
| 2,248,448 | 7/1941 | Chester | 426/139 |
| 2,281,217 | 4/1942 | Turnbull | 426/139 |
| 2,282,661 | 5/1942 | Lewis | 426/306 |
| 2,334,654 | 11/1943 | Sportolari | 426/306 |
| 2,435,906 | 2/1948 | Shapiro | 426/139 |
| 2,462,497 | 2/1949 | Heyman | 426/139 |
| 2,495,403 | 1/1950 | Bernards et al. | |
| 2,511,082 | 6/1950 | Rubin | 426/95 |
| 2,527,993 | 10/1950 | Habler | 426/139 |
| 2,697,041 | 12/1954 | Graham | 426/139 |
| 2,877,117 | 3/1959 | Heyman | 426/139 |
| 3,950,548 | 4/1976 | Baker | 426/101 |

*Primary Examiner*—Steven Weinstein

[57] ABSTRACT

An ice cream confection comprising an edible cone, a fresh, peeled, banana portion frictionally mounted within the cone; and a layer of soft ice cream, supported by the cone, covering the banana portion. The invention is also directed toward a method of making the confection.

10 Claims, 2 Drawing Sheets

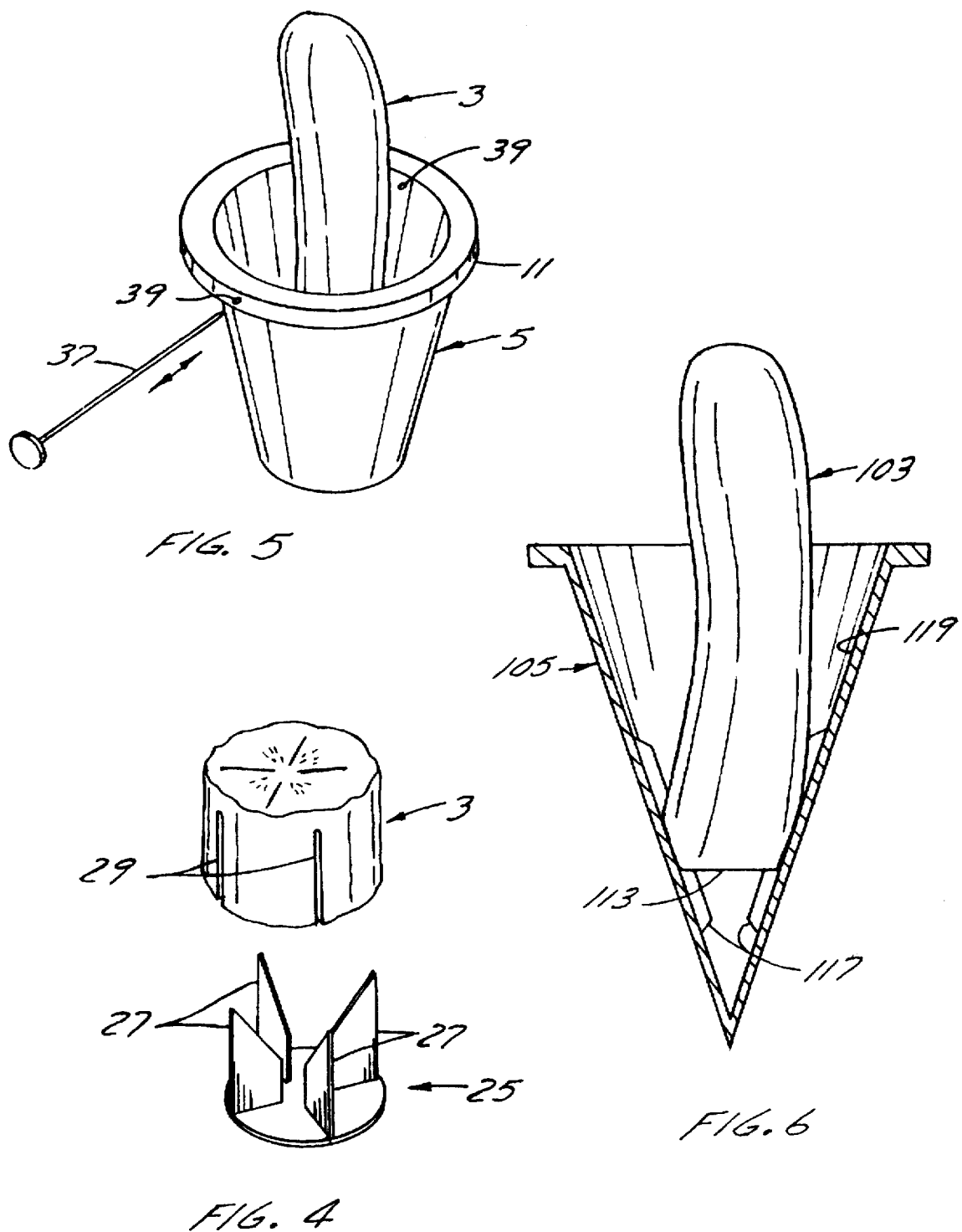

ICE CREAM CONFECTION

BACKGROUND OF THE INVENTION

1. Field of the Invention

This invention is directed toward a new ice cream confection.

The invention is also directed toward a method for making the new ice cream confection.

2. Description of the Related Art Including Information Disclosed Under CFR §§1.97–1.99

A popular ice cream treat is a banana split where a banana, or a part thereof, is split lengthwise, placed in a dish and covered with one or more scoops of hard ice cream. The ice cream in turn is covered with whipped cream and various other dessert garnishes. The ice cream and banana have a taste affinity and the dessert is quite popular. It is eaten with a spoon and/or fork.

SUMMARY OF THE INVENTION

It is the purpose of the present invention to provide a novel variation of the popular banana split. It is another purpose of the present invention to provide a novel banana split confection that can be made fresh when needed. It is further purpose of the present invention to provide a novel banana split confection that is similar to a regular banana split but which can be eaten without the aid of a spoon or a fork. It is a further purpose of the present invention to provide a method of making the novel banana split confection.

It is known to provide a banana split type confection that is frozen. An example of such a confection is shown in U.S. Pat. No. 2,495,403. This known confection has several disadvantages however. The dessert is frozen and thus is not fresh. Also, since bananas do not freeze too well care must be taken that the banana is not frozen with the ice cream. It is also difficult and relatively expensive to make since the confection must be molded.

In accordance with the present invention, the novel banana split confection comprises an edible cone and half of a fresh, peeled banana. The half is formed by cutting the banana in half mid-way between its ends. Means are provided for frictionally mounting the banana portion in the cone. Soft, flowable, ice cream, supported by the cone, covers the banana. If desired, the soft ice cream can be covered with a thin layer of chocolate. Alternatively, the soft ice cream can be garnished with whipped cream and/or other dessert condiments such as nuts or syrups or fruit sauces.

The present invention also covers the method of making the confection which employs the steps of cutting a fresh, peeled banana generally in half, transverse along its length; frictionally mounting the half of the banana in an edible cone; and covering the banana half with a layer of soft ice cream which is supported by the cone.

BRIEF DESCRIPTION OF THE DRAWINGS

FIG. 4 is a perspective view of a blade for cutting the banana portion;

FIG. 5 is a perspective view showing another way of making the confection; and

FIG. 6 is another embodiment of the confection.

DESCRIPTION OF THE PREFERRED EMBODIMENTS

Figure 1:
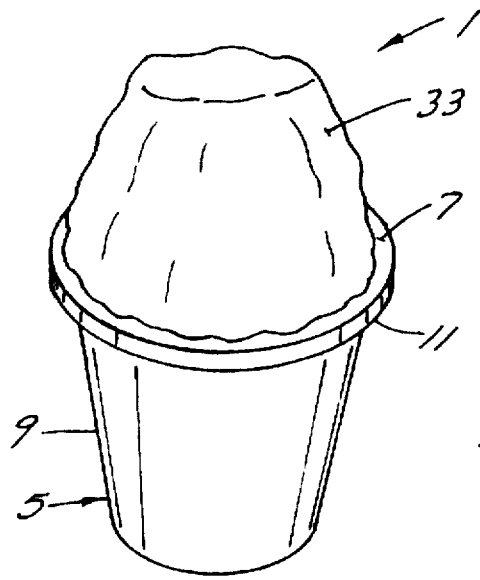
FIG. 1 is a perspective view of the assembled confection.
Figure 2:
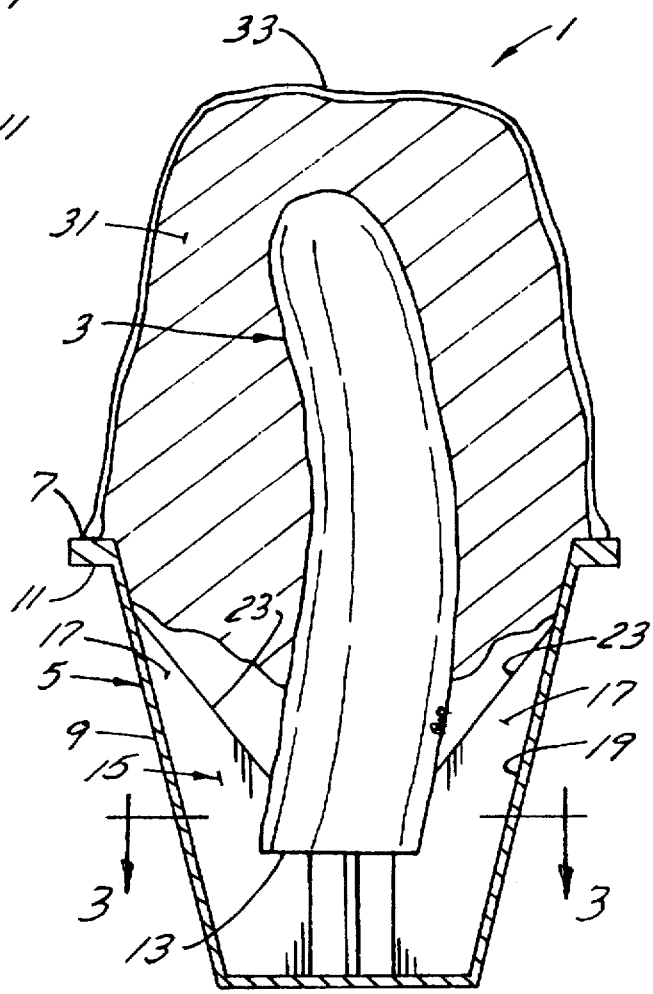
FIG. 2 is a longitudinal cross-sectional view of the confection.

The confection 1 of the present invention, as shown in FIGS. 1 and 2, has a portion of a fresh, peeled, banana 3 mounted in an edible cone 5. The banana portion 3 preferably is a half of a banana, cut along a line transverse to its longitudinal axis. By a half of a banana it is meant an approximate half as determined by eye when cutting the banana. The edible cone 5 can be a wafer type cone, a waffle type cone, or any other edible type of cone. The cone 5 preferably has an open, top end 7 and a truncated bottom portion 9 that forms a handle for holding the cone. The top end 7 of the cone preferably has a wide, enlarged rim 11.

Figure 3:
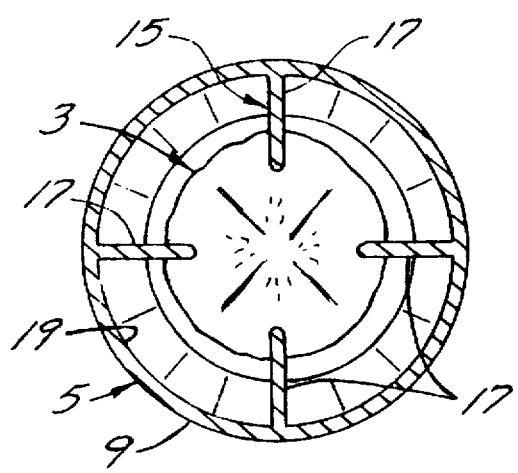
FIG. 3 is a cross-section view of the confection taken along line 3—3 in FIG. 2.

Means are provided for securely holding the banana portion 3 in the cone 5 by one of its ends with the longitudinal axis of the banana portion generally aligned with the longitudinal axis of the cone. Preferably, the banana portion 3 is mounted with its cut end 13 within the cone. The cone 5 preferably is provided with banana holding means 15 within the cone. These holding means 15 can comprise a star arrangement of ribs 17 integrally formed with the wall 19 of the cone. Each rib 17 extends radially inwardly from the wall 19 of the cone, and transversely upwardly from the base 21 of the cone. The top edge 23 of the ribs 17 slopes downwardly from its outer edge adjacent the wall 19. The cut end 13 of the banana portion 3 is impaled on the ribs 17, as shown in FIGS. 2 and 3, to securely, frictionally, hold the banana portion 3 in an upright position in the cone 5. If desired, the cut end 13 of the banana portion 3 may be pre-cut by a star-shaped knife 25, shown in FIG. 4, having the same cross-sectional configuration as the ribs 17. The blades 27 of the knife 25 would be slightly narrower than the cone ribs 17 so that the cuts 29 made in the cut end 13 of the banana portion are spread slightly by the cone ribs 17 when the cut end 13 of the banana portion is frictionally mounted on them. This permits the banana portion to be more tightly gripped by the cone ribs 17. The cone 5 is relatively short so that when the banana portion 3 is mounted within the cone 5, a major portion of it projects upwardly out of the cone as shown in FIG. 2.

Once the banana portion 3 is mounted in place in the cone 5, soft ice cream is swirled about the banana portion 3 to completely cover it in a layer 31 of ice cream. The soft ice cream is of the well known type that is dispensed from a nozzle. The soft ice cream may be swirled about the banana portion by rotating the cone and the banana portion under the outlet spout of a soft ice cream dispenser(not shown). The soft ice cream enters any space between the banana portion 3 and the cone 5 and then rests on the rim 11 of the cone about the banana portion. The ice cream could also be applied over the banana portion 3 from an annular outlet spout in the dispenser with the banana portion entering a central opening in the outlet spout and then being gradually lowered as an annular mass of soft ice cream is dispensed from the outlet spout about the banana portion and onto the rim of the cone. The soft ice cream is supported by the cone both by its truncated wall 19 and the rim 11.

The confection may be served as is once the soft ice cream is layered about the banana portion. However, the confection may now be dipped in liquid chocolate to provide a thin chocolate layer 33 about the ice cream layer 31. Since the cone 5 is turned upside down to dip it in the chocolate, it is necessary to ensure that the banana portion is securely mounted onto the cone so that it will not drop off. Care thus must be taken to securely impale the banana portion 3 onto the ribs 17 in the cone 5 when assembling the confection. To further ensure that the banana portion 3 does not fall off when dipping the confection in chocolate, a pin 37 could be inserted through both the cone 5 and the banana portion 3 to hold the banana portion 3 in place as shown in FIG. 5 before it is covered with soft ice cream. The pin 37 passes through holes 39 formed in the rim 11 of the cone 3 and is removed after dipping is completed. Other suitable means could be employed to hold the banana portion in the cone when the cone is inverted.

In another embodiment of the invention, as shown in FIG. 6, the cone 105 employed could be of a full cone shape instead of being truncated. The cone could have short, radial ribs 117 on its wall 119. The cut end 113 of the banana portion 103 can be forced into the tapered cone 105 coming into tight frictional contact with both the ribs 117 and the wall 119 as shown in FIG. 6. Alternatively, the uncut end of the banana, which normally tapers, can be forced into tight contact with the ribs and wall of the tapered cone to more securely hold the cone in an upright position within the cone. Using an edible cone with a full cone shape results in the banana portion being located more within the cone, as shown in FIG. 6, with less of the banana portion protruding from the cone as compared with a truncated cone. In this embodiment, the cone need not have a wide rim since the ice cream is mainly within the cone supported by its sloping wall 119.

Instead of chocolate, the confection could be completed with whipped cream and/or nuts and/or syrup or fruit sauces or the like and/or pieces of fresh fruit.

The confection has the advantage of being freshly made. It is easy and fast to make, and requires no utensils to eat it. The cone allows the confection to be easily held while eating it.

I claim:

1. An ice cream confection having: an edible cone; at least a substantial portion of a fresh peeled banana; and a layer of soft ice cream; the edible cone having a sidewall with a top rim defining an open mouth, the sidewall tapering down in size from the mouth of the cone toward the bottom of the cone; banana portion engaging means formed on the inside of the edible cone and located toward the bottom of the cone; the banana portion inserted into the cone to have one end of the banana portion frictionally engage the engaging means in a manner such that the banana portion is mounted in an upright position in the cone with its longitudinal axis generally aligned with the longitudinal axis of the cone, the banana portion extending above the rim of the cone and centered with respect to the rim but spaced from it; and the layer of soft ice cream entirely covering the banana portion extending above the rim of the cone.

2. An ice cream confection as claimed in claim 1 including a layer of chocolate covering the exposed ice cream.

3. An ice cream confection as claimed in claim 1 wherein the banana portion engaging means comprise raised ribs on the lower inner surface of the sidewall of the cone, the ribs extending vertically and frictionally engaging the banana portion.

4. An ice cream confection an claimed in claim 1 wherein the layer of soft ice cream is supported on the top rim of the sidewall of the cone.

5. An ice cream confection having: an edible cone; at least a substantial portion of a fresh, peeled banana; and a layer of soft ice cream; the edible cone having a sidewall with a top rim defining an open mouth, the sidewall tapering down in size from the mouth of the cone toward the bottom of the cone, and ribs extending radially inwardly from the sidewall in the lower portion of the cone; the banana portion inserted into the cone so that one end of the banana portion is impaled on, and frictionally engages with, the radial ribs of the cone to mount the banana portion in an upright position with the longitudinal axis of the banana portion generally aligned with the longitudinal axis of the edible cone, the banana portion extending above the rim of the cone and centered with respect to the rim but spaced from it; and the layer of soft ice cream entirely covering at least the banana portion extending above the rim of the cone.

6. An ice cream confection as claimed in claim 5 wherein the one end of the banana portion is a cut end, the banana portion having narrow slots extending longitudinally from the cut end to frictionally receive the radial ribs.

7. An ice cream confection as claimed in claim 6 including a layer of chocolate covering the exposed ice cream.

8. An ice cream confection as claimed in claim 6 wherein the layer of soft ice cream is supported on the top rim of the sidewall of the cone.

9. An ice cream confection as claimed in claim 5 including a layer of chocolate covering the exposed ice cream.

10. An ice cream confection as claimed in claim 5 wherein the layer of soft ice cream is supported on the top rim of the sidewall of the cone.

* * * * *